United States Patent [19]  [11] Patent Number: 4,471,999
Browne  [45] Date of Patent: Sep. 18, 1984

[54] VEHICLE WHEEL ASSEMBLY WITH INSULATION INTERMEDIATE BEAD SEATS

[75] Inventor: Alan L. Browne, Grosse Pointe, Mich.

[73] Assignee: General Motors Corporation, Detroit, Mich.

[21] Appl. No.: 384,789

[22] Filed: Jun. 4, 1982

[51] Int. Cl.³ .......................... B60B 3/06; B60B 5/02; B60B 7/04
[52] U.S. Cl. ........................... 301/63 PW; 301/6 WB
[58] Field of Search .................. 188/264 G; 301/6 R, 301/6 WB, 37 P, 63 PW

[56] References Cited

U.S. PATENT DOCUMENTS 2,065,088 12/1936 Mueller ........................... 188/264 G
3,669,501 6/1972 Derleth ........................... 301/37 P X
3,703,317 11/1972 Laun ................................. 301/6 R
3,843,188 10/1974 Kirschner ................... 301/6 WB X

FOREIGN PATENT DOCUMENTS 469292 7/1937 United Kingdom .......... 188/264 G

Primary Examiner—David A. Scherbel
Attorney, Agent, or Firm—Herbert Furman

[57] ABSTRACT

Tire power loss is reduced in a vehicle wheel by coating the portion of the rim exposed to the interior inflated cavity of the tire and the opposite portion of the rim exposed to ambient with a coating of low thermal conductivity material covered by a coating of low emissivity. Further reductions in tire power loss can be obtained by coating the portions of the wheel disc exposed to ambient with the same material.

2 Claims, 1 Drawing Figure

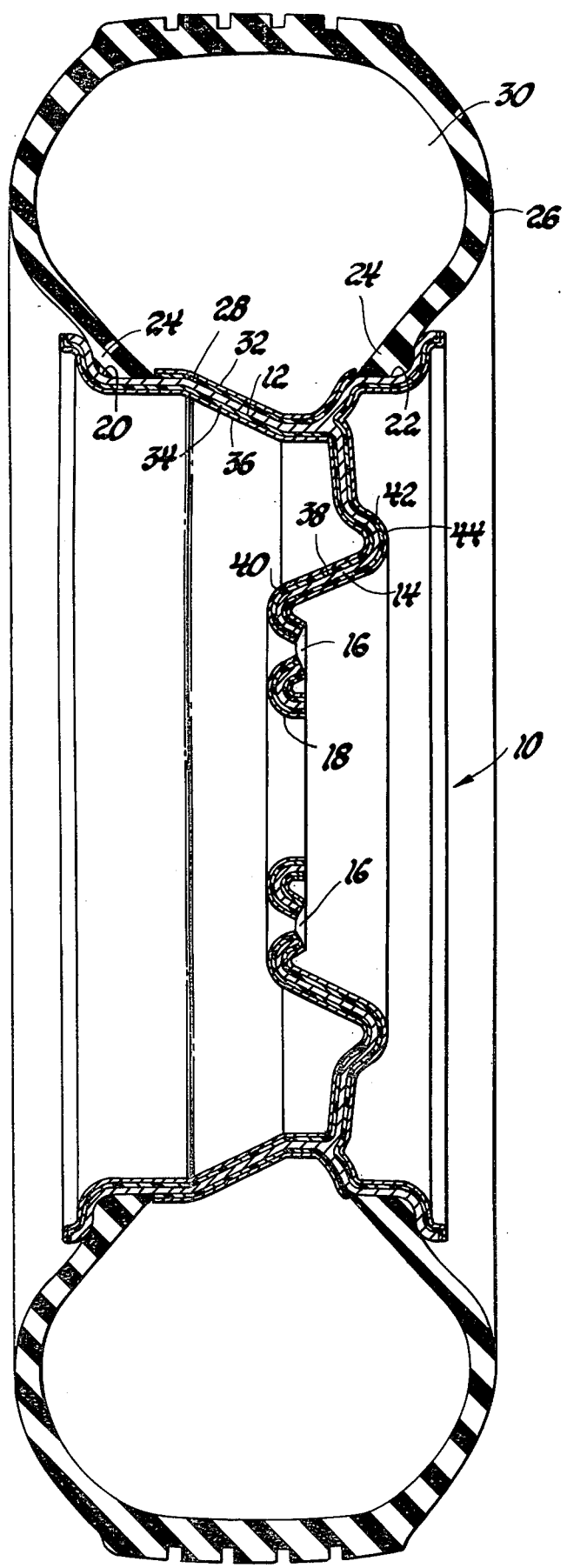

VEHICLE WHEEL ASSEMBLY WITH INSULATION INTERMEDIATE BEAD SEATS

This invention relates generally to vehicle wheel assemblies and more particularly to a thermally insulated vehicle wheel assembly which reduces tire power loss by increasing the temperature of an inflated rolling tire in thermally underutilized areas.

BACKGROUND OF THE INVENTION

It is well known that heat is generated in an inflated rolling tire as the vehicle travels down the road due to the dissipation of energy within the viscoelastic materials from which the tire is made. The rate of energy dissipation within the tire materials, termed tire power loss, decreases as the tire temperature increases. Thus, the higher the temperature of the tire, the less the tire power loss.

The wheel which supports the inflated tire provides one of the major paths for the escape of heat from the tire to ambient. If the flow of heat from the tire to the wheel and from the wheel to ambient can be reduced, tire power loss will be decreased since the tire will run at a higher temperature.

SUMMARY OF THE INVENTION

This invention thermally insulates the wheel to reduce tire power loss by decreasing the heat flow from the tire to the wheel and from the wheel to ambient. In the preferred embodiment of the invention, the inner surface or portion of the rim exposed to the interior inflated cavity of the tire is provided with a low thermal conductivity coating, such as a coating of polypropylene or polyurethane of from one to two millimeters thick. This low thermal conductivity coating is then covered with a thin reflective layer or coating of low emissivity in the range of 0.04 to 0.06 such as a film of either nickel or chrome. The outer opposite surface or portion of the rim exposed to ambient is also provided with the same low thermal conductivity and low emissivity coatings. The coatings on the inner portion of the rim exposed to the interior inflated cavity of the tire restrict both convective and radiative heat flow from the tire to the wheel rim and the coatings on the outer portion of the rim restrict convective and radiative heat flow to ambient. Since the bead regions of the tire are thermally underutilized areas, the restriction of heat flow from the tire to the wheel rim and to ambient increases the temperature of the tire in these thermally underutilized areas to thereby reduce tire power loss.

Heat can also flow by conduction from the wheel rim to the wheel disc and thence to ambient by convection and radiation. Therefore, to obtain a further reduction in tire power loss, the coatings may be applied to all or some of the portions or surfaces of the wheel disc exposed to ambient. While such coatings may further reduce tire power loss, the coatings may not be viable in all wheel assemblies due to possible negative effects on the conductive cooling of wheel bearings, brakes or other components mounted on or adjacent the wheel. Such components are cooled both by conductive heat flow to the wheel disc and convective and radiative heat flow to ambient. Restricting conductive heat flow to the wheel disc by restricting convective and radiative heat loss from the wheel disc to ambient may increase the running temperature of such components beyond predetermined limits and therefore the coatings are selectively applicable to the wheel disc and may be entirely dispensed with if necessary.

Vehicle wheels are currently manufactured from both steel and aluminum and may very well be manufactured in the near future from plastic materials. The transfer of heat from the tire to the wheel rim will vary with the material of the rim and likewise the transfer of heat from the wheel rim to the wheel disc will vary with the material of the rim and disc. Aluminum has the highest rate of heat transfer while plastic has the lowest. Thus, the achievable reduction in tire power loss by the coatings will vary with the material of the wheel.

It is therefore the primary object of this invention to provide a thermally insulated wheel assembly which reduces the tire power loss by increasing the temperature of an inflated rolling tire in thermally underutilized areas.

These and other objects of the invention will be readily apparent from the following specification and drawing wherein:

The FIGURE is a sectional view of a vehicle wheel according to this invention.

DESCRIPTION OF THE PREFERRED EMBODIMENT

Referring now to the drawing, a vehicle wheel designated generally 10 is formed of cast aluminum. The wheel includes a drop center type rim 12 and an integral wheel disc 14. The disc 14 includes a series, normally five, of holes 16 and a center pilot hole 18 for mounting the wheel on a conventional axle assembly of a vehicle.

The drop center type rim 12 includes a pair of bead seats 20 and 22 which seat the beads 24 of an inflated vehicle tire 26. Although not shown, a conventional valve stem provides for inflation of the tire 26 once mounted on the wheel 10.

An inner coating 28 of low thermal conductivity material, such as polypropylene or polyurethane, is applied to the inner portion or surface of the rim 12 between the bead seats 20 and 22 and normally exposed to the interior inflated cavity 30 of the tire 26. The coating 28 is from one to two millimeters thick. An outer film or coating 32 of low emissivity material in the range of 0.04 to 0.06, such as nickel or chrome, is applied over the coating 28. Likewise inner and outer coatings 34 and 36 of the same materials are applied to the outer surface or portion of the rim 12 which is exposed to ambient, and continued as coatings 38 and 40 and 42 and 44 over the inner and outer surfaces or portions of the wheel disc 14 which are exposed to ambient.

The bead seat areas of the tire 26 which are adjacent the tire beads 24 are thermally underutilized areas of the tire. The coatings 28 and 32 restrict the convective and radiative transfer of heat from the tire to the wheel rim as the heat is generated in the tire during movement of the vehicle along the road to reduce tire power loss. The tire will run at a higher temperature than normal as the thermally underutilized areas of the tire increase in temperature and become thermally utilized.

The coatings 34 and 36 on the outer surface of the rim exposed to ambient restrict the flow of heat from the rim to ambient due to convection and radiation, respectively. Since the tire bead seat areas 20 and 22 of the rim are not coated, heat can transfer from the tire to the rim at these areas and thence be convected and radiated to ambient from the outer surface of the rim. The coatings 34 and 36 restrict such loss of heat due to convection and radiation to obtain a further reduction in tire power loss.

Further reductions in tire power loss can be obtained if the coatings 38 and 40 and 42 and 44 are applied to the inner and outer surfaces of the wheel disc. While not shown in the drawings, certain wheel components such as bearings and brake elements are mounted on or adjacent the wheel. Such components rise in temperature as the vehicle travels on a roadway. In a normal wheel, heat is transferred by conduction from such elements to the wheel disc and thence transferred to ambient by convection and radiation from the disc. The coatings 38 and 40 and 42 and 44 will restrict the convective and radiative loss of heat from the disc. In certain installations this restriction in heat loss may cause the wheel bearings or brake components to run at a temperature above a certain predetermined limit. This could occur if the cooling of such elements by radiation to ambient, cooling by the flow of ambient air over the elements, is restricted. In such instances, the coatings 38 and 40 or 42 and 44 on one or both surfaces of the disc may be dispensed with.

From the foregoing it can be seen that tire power loss can be reduced by coating the surfaces or portions of the wheel rim exposed to the interior of the inflated tire and ambient with a low thermal conductivity material and a high reflective material to utilize to a greater degree certain thermally underutilized areas of the tire by causing the tire to run at a higher temperature. A further reduction in tire power loss can be obtained by coating the surfaces or portions of the wheel disc exposed to ambient with the same materials. Thus this invention provides an improved vehicle wheel assembly.

The embodiments of the invention in which an exclusive property or privilege is claimed are defined as follows:

1. In a vehicle wheel assembly including a rim and a wheel disc and an inflated tire mounted on the rim and having the side wall beads thereof seated on the bead seats of the rim, the improvement comprising,
   a first coating of low thermal conductivity material on the portion of the rim which is intermediate the bead seats of the rim, the first coating terminating at the side wall beads of the tire whereby the side wall beads of the tire seat directly on the rim and the coating covers only the intermediate portion of the rim exposed to the interior inflated cavity of the tire, and
   a second coating of low emissivity material on the first coating,
   the first and second coatings on the intermediate portion of the rim exposed to the interior of the tire restricting the passage of heat by convection and radiation from the tire to such intermediate portion of the rim and from such intermediate portion of the rim to atmosphere to increase the running temperature of the side wall beads of the tire and thereby utilize such beads to reduce tire power loss.

2. In a vehicle wheel assembly including a rim and a wheel disc and an inflated tire mounted on the rim and having the side wall beads thereof seated on the bead seats of the rim, the improvement comprising,
   a coating of low thermal conductivity material of the class consisting of polypropylene or polyurethane on the portion of the rim which is intemediate the bead seats of the rim, the first coating terminal at the side wall beads of the tire whereby the side wall beads of the tire seat directly on the rim and the coating is exposed only to the interior inflated cavity of the tire,
   a second coating of low emissivity material in the range of 0.04 to 0.06 on the first coating,
   the first and second coatings on the intermediate portion of the rim reducing tire power loss by restricting the passage of heat from the interior inflated portion of the tire to such intermediate portion of the rim by convection and radiation and, from such intermediate portion of the rim to atmosphere to increase the running temperature of the thermally under utilized side wall beads of the tire,
   a coating of low thermal conductivity material on the opposite portion of the rim exposed to ambient, and
   a coating of highly reflective material over the coating of low thermal conductivity material to reduce heat loss by radiation to ambient.

* * * * *